United States Patent [19]

Connor et al.

[11] Patent Number: 4,838,009
[45] Date of Patent: Jun. 13, 1989

[54] METHOD OF HEAT ACTIVATING TOP CLOSURE PANELS

[75] Inventors: Richard J. Connor, Pine Bush, N.Y.; Gerald F. Justice, Tracy, Calif.

[73] Assignee: International Paper Company, Purchase, N.Y.

[21] Appl. No.: 238,423

[22] Filed: Aug. 31, 1988

[51] Int. Cl.⁴ .................. B65B 51/20; B65B 7/18
[52] U.S. Cl. .................. 53/477; 53/373; 53/375; 53/379; 53/491; 156/497; 493/134
[58] Field of Search .............. 53/373, 375, 379, 383, 53/477, 484, 491, 565; 156/82, 497, 499; 493/134, 135

[56] References Cited

U.S. PATENT DOCUMENTS

| | | | |
|---|---|---|---|
| 3,392,458 | 7/1968 | Braun | 493/134 X |
| 3,789,746 | 2/1974 | Martensson | 53/375 X |
| 3,825,408 | 7/1974 | Farfaglia | 156/497 X |
| 4,511,426 | 4/1985 | Linner | 53/477 X |

Primary Examiner—Robert L. Spruill
Assistant Examiner—Linda B. Johnson
Attorney, Agent, or Firm—Walt Thomas Zielinski

[57] ABSTRACT

A method of heat activating the interior surfaces of the top closure, fin forming panels of a paperboard carton of the type shown in U.S. Pat. No. 4,732,275 to thereby render their PE coating tacky prior to folding the panels to form the carton top closure. The geometry of the two fin forming panels is such that their interior surfaces require a U-shaped heating pattern, as opposed to heating their entire areas. This U pattern is achieved by a specific hot air jet arrangement on an otherwise conventional nozzle block and by moving the nozzle towards and away from the carton as the carton moves past the nozzle block. The method also includes heating by a second nozzle block, to increase the rate of production of closed cartons. The fin forming panels of the cartons may also be preheated.

6 Claims, 8 Drawing Sheets

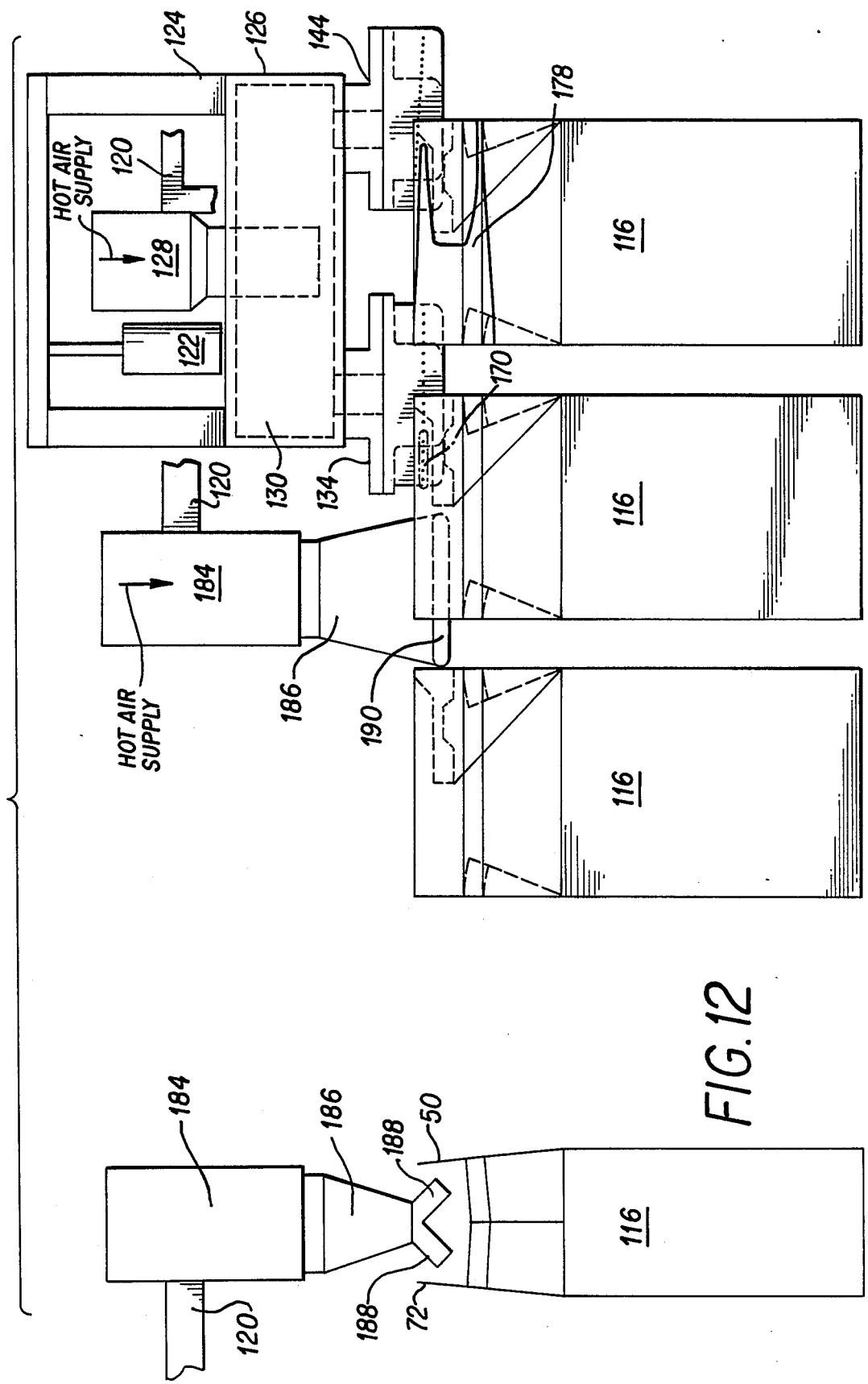

METHOD OF HEAT ACTIVATING TOP CLOSURE PANELS

BACKGROUND OF THE INVENTION

This invention relates to a method of heat activating certain top closure panels of a paperboard carton, wherein the interior surfaces of the carton carry a thin layer of polyethylene (PE). This layer or coating serves both to protect the carton contents from direct contact with the paperboard as well as an adhesive when heat activated to cause it to become tacky. Such heat activation is often carried out by hot air jets. The invention exhibits particular utility with respect to cartons of the type shown in U.S. Pat. No. 4,732,275 issued to Hambleton et al, herein incorporated by reference.

A carton of the type of the noted Hambleton patent includes a pair of opposedly facing fin panels which are secured together to form a double thickness fin which is folded, after lamination, down on top of the container, to thereby form a flat topped carton or container. The geometry of the fin forming panels requires heat activation of a specific pattern. The required heat activating pattern for the fin forming panels is that of a sidewise oriented U. While such a pattern can readily be produced by hand, its production by automatic machinery is not known in this art. Accordingly, the use of typical nozzle blocks having small apertures in regular patterns to produce hot air jets such as shown in Egleston U.S. Pat. No. 3,309,841 is not suitable for this particular type of carton. Typical nozzle blocks produce a more or less uniform pattern of hot air jets, to thereby uniformly heat activate the PE coated interior surfaces of top closure panels of paperboard containers.

SUMMARY OF THE INVENTION

According to the practice of this invention, otherwise conventional dual nozzle blocks such as shown in Allen U.S. Pat. No. 3,918,236 for producing adhesive activating hot air jets are modified so as to exhibit a specific pattern of the air holes which produce the jets and thereby make possible the mass production by automatic machinery of cartons of the Hambleton type. In combination with this air hole pattern modification, the nozzle blocks are vertically reciprocated in timed relation to the translation of filled containers passing beneath the nozzles, to effect the desired pattern of adhesive actuation. The pattern may by characterized as in the shape of a sidewise positioned U, namely a U swung 90 degrees from its usual position, so that it lies on one of its legs.

BRIEF DESCRIPTION OF THE DRAWINGS

FIG. 12 is a view similar to FIG. 10 and illustrates a modification wherein the cartons are preheated.

DETAILED DESCRIPTION OF THE INVENTION

Figure 1:
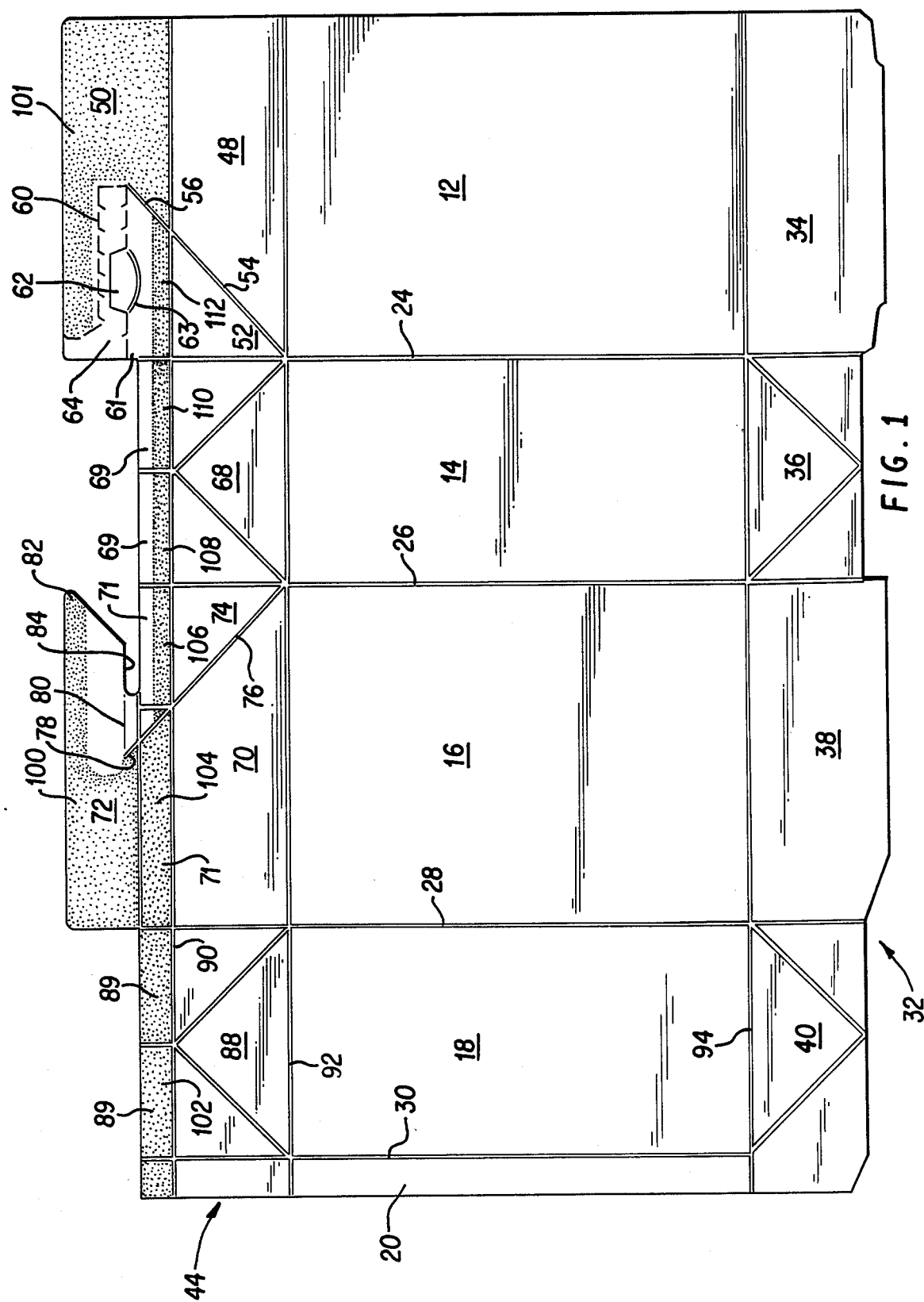
FIG. 1 is a plan view of a one-piece blank of PE coated paperboard for forming the carton and also shows the pattern of heat activated PE on the top closure panels which are produced by the method of this invention.
Figure 2:
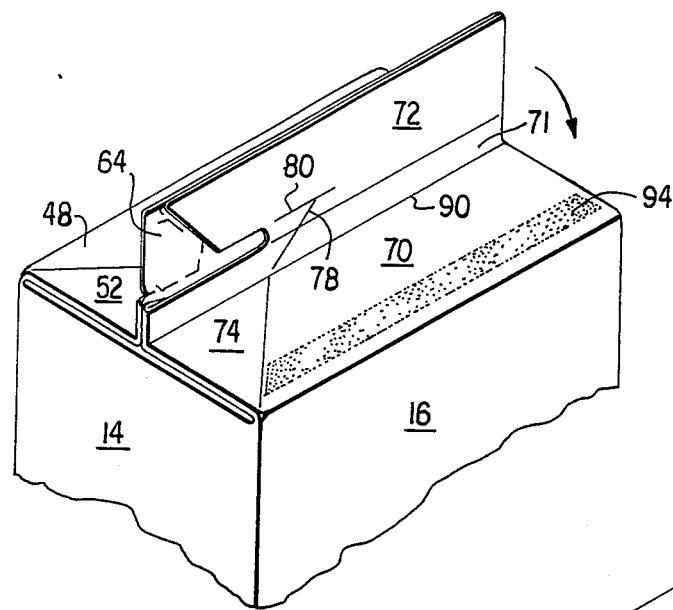
FIGS. 2-7 are prospective views showing various stages in the closing opening and reclosing of the carton.
Figure 3:
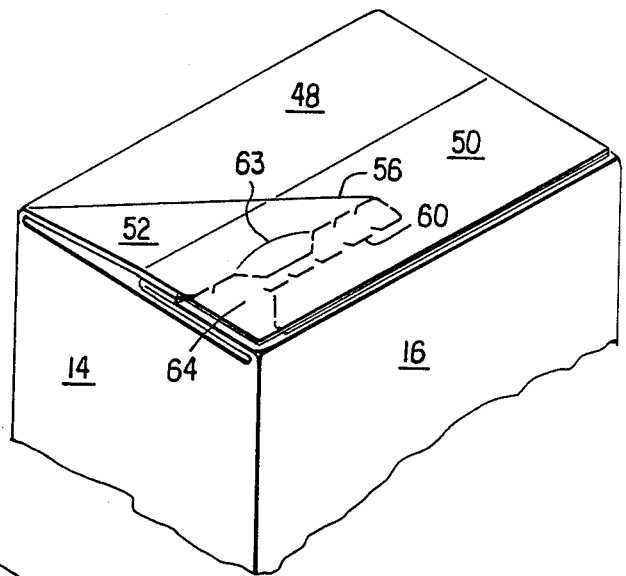
Figure 4:
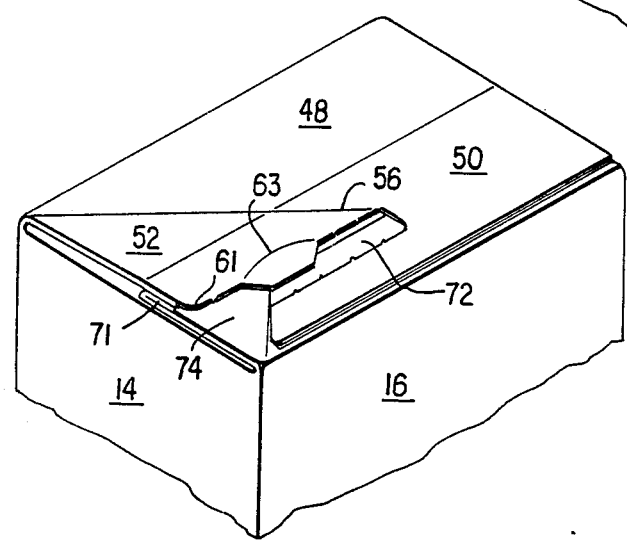
Figure 5:
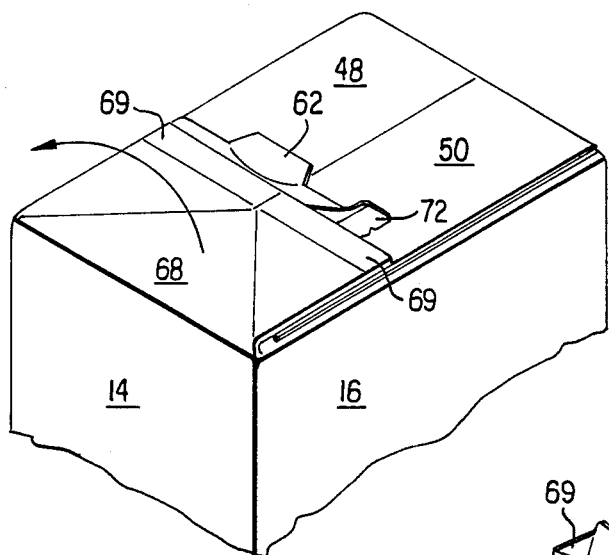
Figure 6:
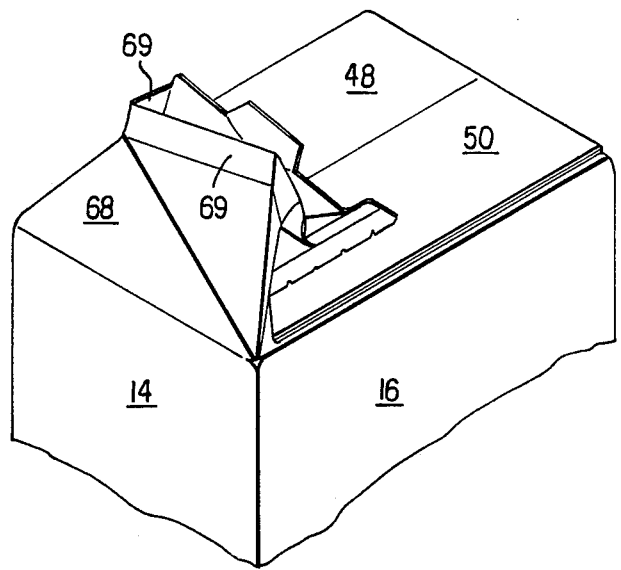
Figure 7:
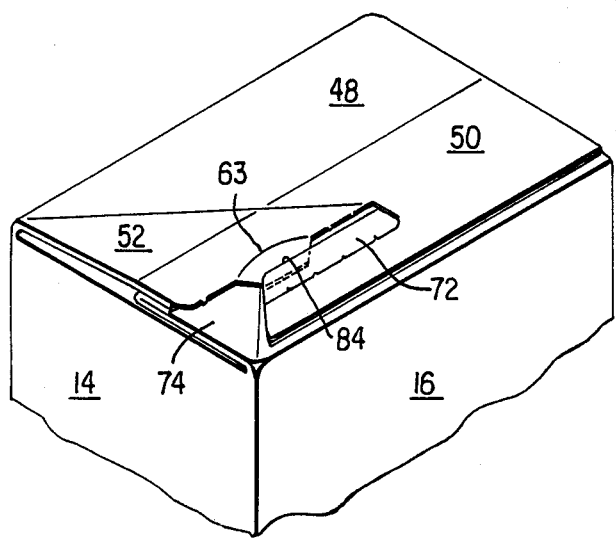

Referring now to FIG. 1 of the drawings, the unitary blank for forming the carton of the Hambleton patent is illustrated, FIG. 1 being taken primarily from this patent. At the top of the blank, certain stippled areas are shown and will now be described. The numeral 100 denotes a generally horizontally disposed U adhesive pattern on fin forming panel 72. The lower leg of the U is denoted by the numeral 104. The numeral 101 denotes the U adhesive pattern on the other fin forming panel 50, and the lower leg of this horizontally disposed U is denoted by the numeral 112. Other heat activated areas of the blank are denoted by the numerals 102, 106, 108 and 110. As will shortly be apparent, the heat activated portions of the blank are only formed (by hot air jets) after the blank has been erected and filled and ready for final closure and sealing. From a consideration of FIGS. 2-7, it will be apparent that the heat-activated adhesive pattern shown in FIG. 1 will result in an optimum ease of both opening and reclosing the carton shown at FIG. 3. For example, at FIG. 3, the non heat activation of the PE on tear strip 64 permits it to be removed when pulled upwardly from the position there shown. Otherwise, this tear strip would stick to its corresponding, opposite portion on fin forming panel 72. Similarly, the non-heat activated panels above activated areas 106, 108 and 110 provide an optimum balance of the sealing of these panels and the desire that they be relatively easy to open to form a pour spout, as indicated at FIGS. 5 and 6. With respect to the tuck in locking feature illustrated at FIG. 7, the non activated surface of tab or tongue 62 and its counterpart area on fin 72 permits the locking action described in the Hambleton patent. Thus, heat activating the entire mating surfaces of fin panels 50 and 72 would effectively preclude the mode of operation of opening and reclosing described in the Hambleton patent.

Referring now to FIGS. 8-11, the numeral 116 will denote a carton of the type of the noted Hambleton patent which has been erected and which has been filled, typically with a food product, and which is ready to be closed by the inward folding of the still upstanding top closure panels.

The numeral 120 denotes generally a frame portion of a machine for the automated, production line closing of such containers. Such machines are known, as exemplified by U.S. Pat. No. 3,200,557 issued to Schwenk, and U.S. Pat. No. 3,370,399 issued to Egleston. The particular machine employed with the method of this invention is commercially designated as an Excello Model WP 3-quart machine. An air cylinder 122 is mounted on the machine frame and carries a vertically reciprocating support frame 124, the latter moving upwardly and downwardly in response to the actuation of air cylinder or motor 122. Hot air supply 128 is mounted on the machine frame 120, with the lower portion of 128 slidably extending into plenum chamber 130. The hot air feeds into a lower portion 126 of support frame 124, the latter including the plenum chamber 130. This latter chamber communicates with a first nozzle block 134, whose lower portions are provided, on those two opposite sides parallel to the direction of motion of the cartons, with three horizontally extending rows of openings, to produce horizontally directed jets of hot air. The rows are denoted by the numerals 136, 138 and 140, with rows 136 and 140 being of a horizontal extent less than half of the horizontal extent of row 138, the latter spanning the entire horizontal length of the lower portion of nozzle block 134. The hot air jet pattern produced by these three rows is generally that of a horizontally disposed T, with all three rows contributing to the head and only row 138 defining the leg or base of the T.

Figure 8:
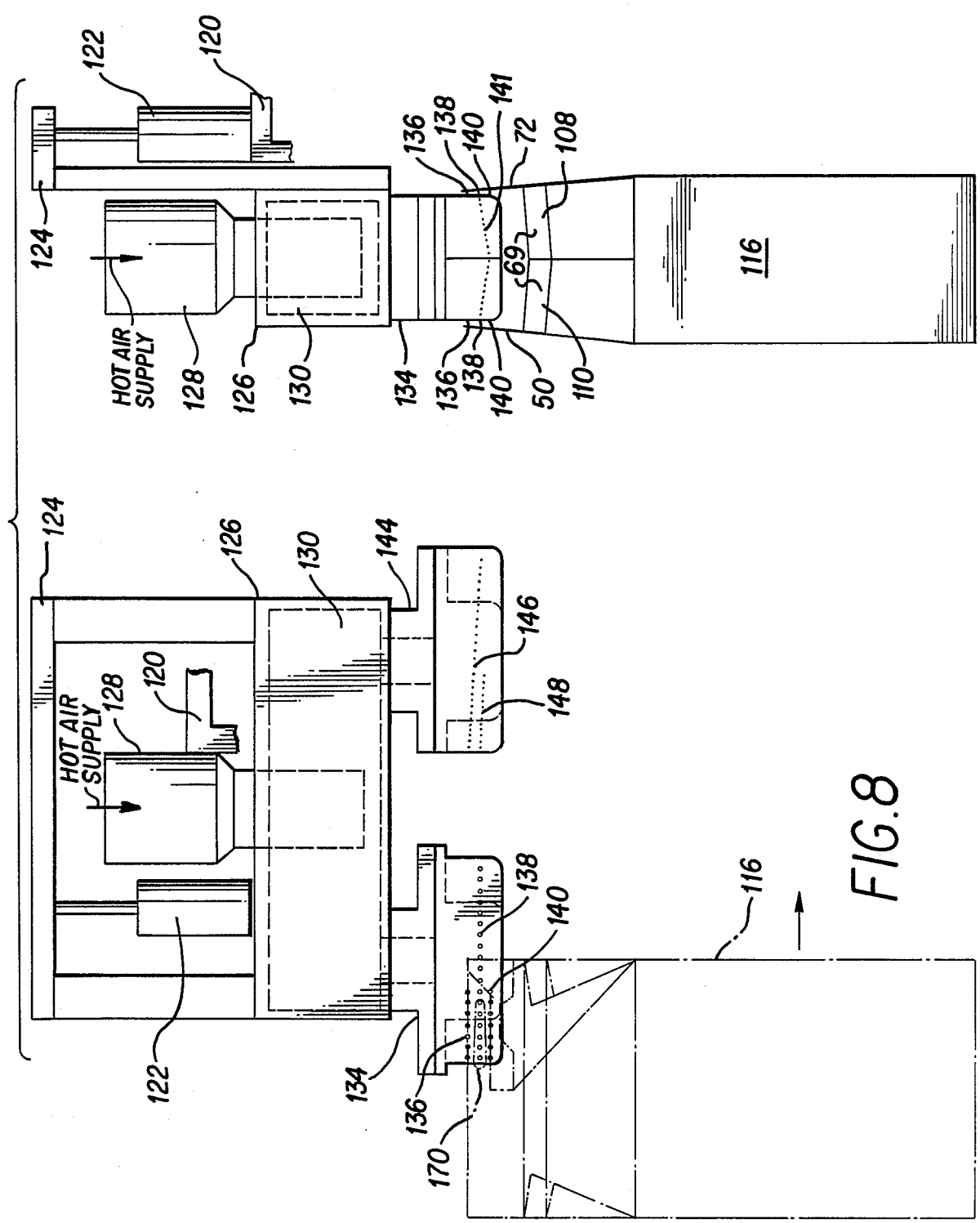
FIGS. 8-11 are each dual views, showing both side and end elevations, of a portion of a conventional carton top closure panel treating machine provided with the novel nozzle block hot air jet patterns of this invention, and illustrate a typical sequence for effecting the heat activation pattern of this invention for the top closure panels of a carton of the type described in the Hambleton patent.

The two nozzle block ends, extending transverse to the machine direction of the cartons, are each provided with a row 141 of hot air jet openings which slant toward the center of the block, to thereby correspond to the tilt of the inwardly bowed carton end panels 89 and 69, one such tilted row 141 is shown at the end elevation of FIG. 8.

A second nozzle block is in communication with plenum 130 and is denoted by the numeral 144. This second nozzle block is otherwise of the same construction as the first, except that its pattern of air jet holes is different. The numerals 146 and 148 denote generally horizontally extending rows of air holes, although they slant slightly downwardly from left to right. It will be noted that the length of the row 148 is less than half of that of row 146. Just as with rows 136, 138 and 140 of nozzle block 134, rows 146 and 148 are each on opposite sides of nozzle block 144.

Each upstream (left) and downstream (right) end of block 144, as block 134, is provided with a tilted row 141 of hot air jet forming openings, except that the upstream end is provided with two such bent rows, parallel to and vertically spaced from each other.

FIG. 8 illustrates the first steps in the method of this invention is indicated at FIG. 8 and includes a first filled carton 116 being moved from left to right, so that the hot air jets from the apertures of nozzle block 134 partially heat activate the upper legs of horizontally disposed U-shaped areas 100 and 101, as referred to FIG. 1. The nozzle 134 is in its up position and the commencement of the upper U leg heat activation is denoted by 170. During this left to right movement of carton 116, the upper legs of U patterns 100 and 101 commence to receive heat from the hot air jets, and a partial softening or tackiness in the PE coating results. This partial softening commences at the tips of the U upper legs and moves towards the bight portions of the U regions.

Figure 9:
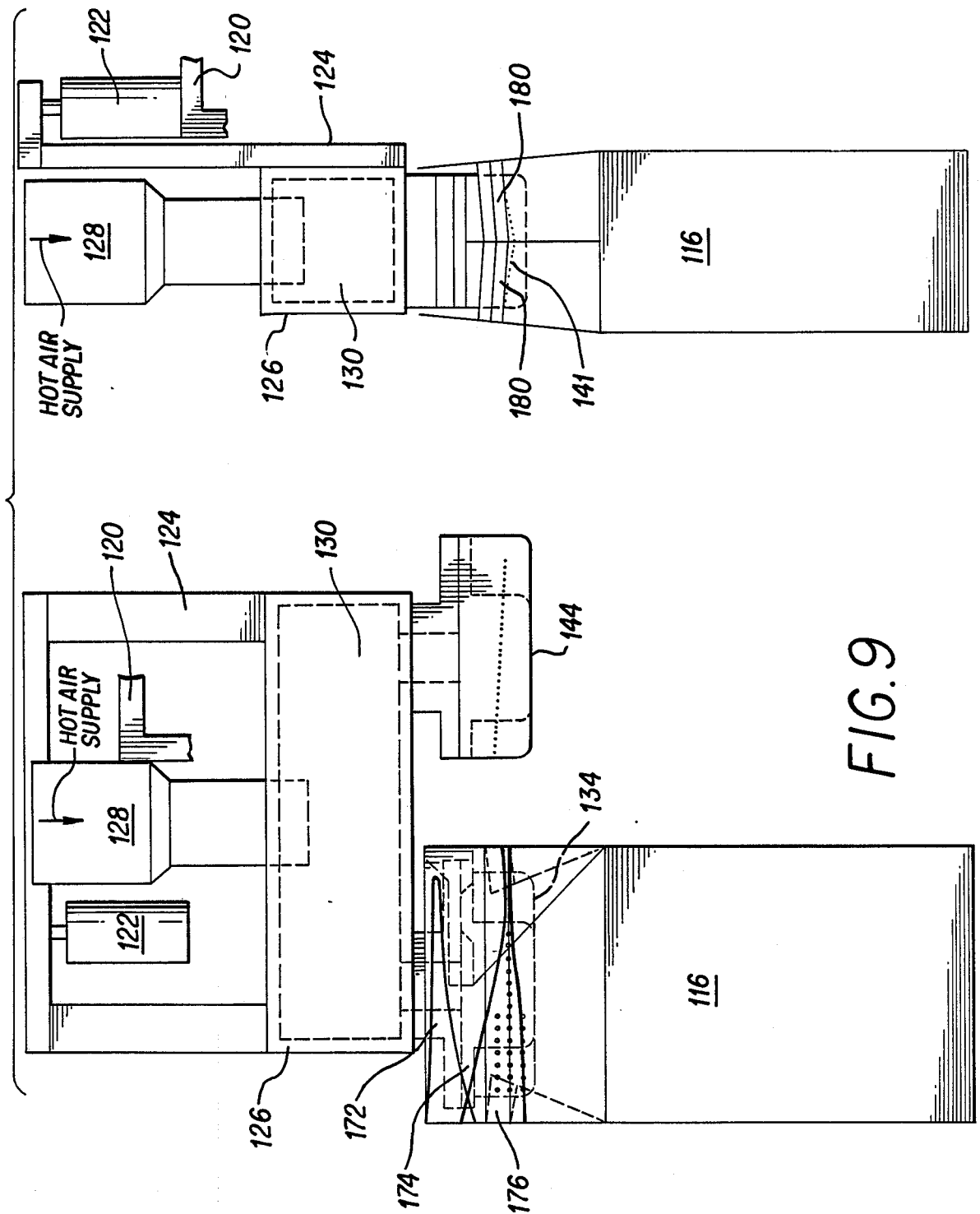

Referring now to FIG. 9 of the drawings, the carton 116 has moved to a position vertically aligned with nozzle block 134, upper U leg activation being denoted by 172, and the nozzle has been moved to its down position toward the interior of the carton. Because of the alignment between the three rows of jets from openings 136, 138 and 140 and bight portions of patterns 100 and 101, the bight portions 174 of the latter become at least partially heat activated, i.e., commence to become tacky. The lowering of block 134 is also indicated at the right hand or end elevation of FIG. 9. There the heat activation of the PE on the end panel portions of one end of the carton is denoted by 180 and is caused by the air jets in row 141 on one downstream end of the nozzle block. The spaces between the legs of the U shapes 100 and 101 receive heat from the hot air jets forming the mentioned T pattern, but this amount of heat is less than required to make the PE coating there tacky. The lower U leg activation is denoted as 176. It will be recognized that area 174 receives heat from the jets while nozzle 134 is moving from its up to its down position, while the nozzle is in the down position, and also while the nozzle is moving from its down to its up position.

Figure 10:
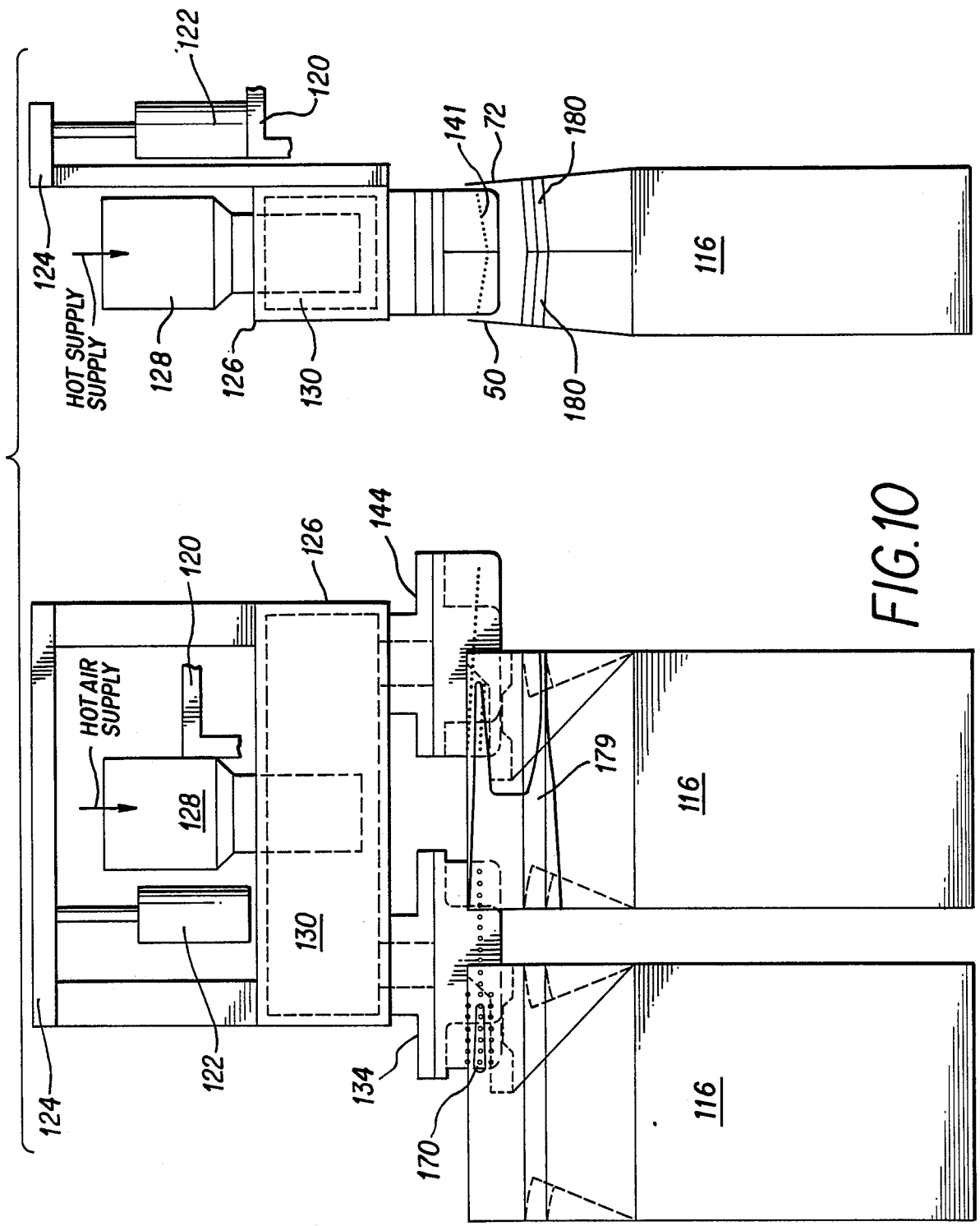

Referring now to FIG. 10 of the drawings, the nozzles 134 and 144 have been moved to their up position. Then, the first carton is moved to a position partially coincident with the second nozzle block 144 and a second carton 116 is moved to a position partially coinciding with the first nozzle block 134, the second carton 116 being shown in the same position as the first carton in FIG. 8. The entire U shape heat activation on the first carton is denoted as 178 (being a summation of areas 172,174,176) and the tip 170 of the upper U leg of the second carton is shown under first nozzle 134.

Figure 11:
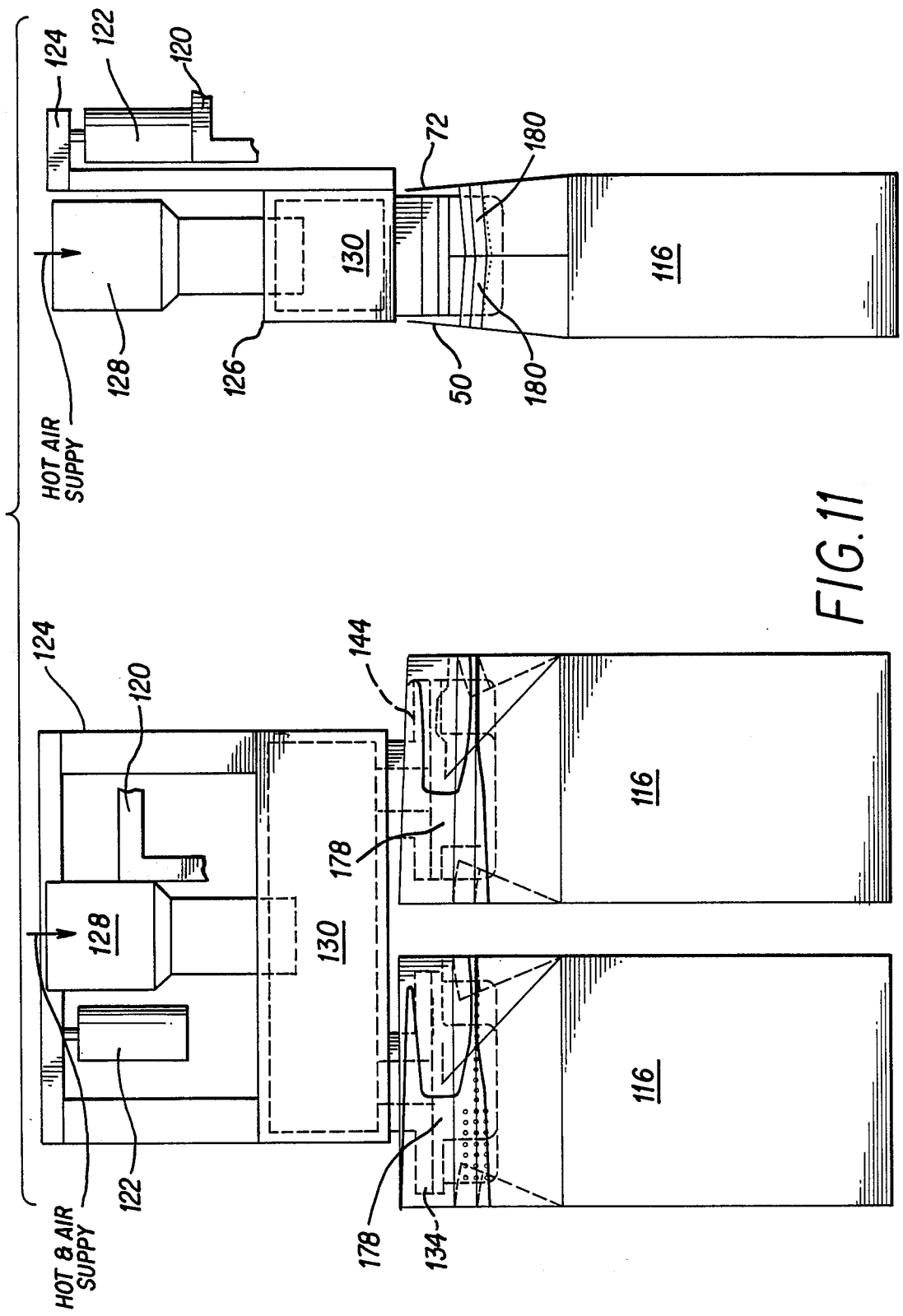

As shown at FIG. 11 of the drawings, both the first and second cartons 116 have stopped at their respective nozzle blocks or heater stations and the nozzle blocks are in their down position.

The tilt of air jet rows 146 and 148 is to maintain their jets in alignment with the partially forwardly slanted fin forming panels 50 and 72, such slanting of these latter panels being caused by conventional rails (not shown) which have commenced partially folding the fin panels towards each other. The tilting over of top closure panels for paperboard cartons to effect closure is known, as may be seen by reference to FIGS. 3-5 of U.S. Pat. No. 4,126,981 issued to King.

Subsequent to the position of the cartons and nozzles shown at FIG. 11, the left to right movement of the cartons continues, with other cartons coming in from left to right and with the first carton 116 going on to one or more downstream positions for final closure and sealing by any known machines or methods.

The heat activation operation carried out by the first nozzle block 134 yields the desired U pattern on panels 50 and 72, although the degree of heat activation for these and the other panel portions is less than required for final carton closure. If the dwell time of the carton at the conclusion of the operation shown at FIG. 9 were long enough, the PE would absorb enough heat from the jets to be in a condition for final fin lamination and carton top closure. However, for more rapid production of closed cartons, the dwell time under nozzle 134 is decreased and the carton is moved to the second nozzle block 144. While aligned with the latter, the PE on the fins receives heat from the jets in rows 146 and 148. This additional time results in the transfer of sufficient heat to fully activate the fin and other PE coated top closure panels for final closing. Thus, one function of the second nozzle is to increase the rate of production of closed cartons.

Referring now to FIG. 12 of the drawings, a modification is shown wherein the cartons are preheated prior to the heat activation steps illustrated at FIGS. 8 to 11.

A carton preheating unit is positioned immediately or proximally upstream of first nozzle block 134. This heating unit, denoted as 184, is preferably mounted on a portion of machine frame 120 and is connected to a hot air supply duct (not illustrated). The lower portion of heating unit 184 is provided with a nozzle 186 downwardly converging in end elevation and downwardly diverging in side elevation. The exit or lower end of nozzle 186 terminates in two identical divergent nozzles 188 each having an output opening or orifice 190. Nozzles 188 are each oriented at about 45 degrees to the horizontal.

In operation, the cartons 116, at ambient temperature, sequentially pass below nozzles 188. The warm air exiting from each opening 190 of its respective nozzle 188 preheats a respective fin panel 50, 72 prior to its moving underneath the first encountered nozzle block 134. This preheating provides a gentle warming of the fins 50, 72 and thus permits lowering of the heat requirements of nozzle blocks 134 and 144. Preferrably, the air from nozzles 188 is directed at the base of a respective fin panel 50, 72. After this preheating, the operation is the same as that previously described and show at FIGS. 8 to 11.

What is claimed is:

1. A method of heating the heat activatable PE coated interior surfaces of generally vertically extending top closure flaps of an erected and filled paperboard carton, said closure flaps including a first pair of oppositely disposed, fin forming panels each of whose facing interior surfaces is to be heat activated over a horizontally oriented U-shaped area, said method including the steps of, (1) partially inserting between said first pair of fin forming panels a first hot air nozzle in the latter's up position, said first hot air nozzle having an up and a down position, said first hot air nozzle having air holes for producing horizontally directed hot air jets against the upper U legs of each of said first pair of fin forming panels, said air holes being in horizontal rows and defining a generally horizontal T pattern, (2) moving the carton horizontally relative to the first nozzle to cause the air jets forming the head of the T pattern to move toward the bights of the U-shapes, (3) moving said first nozzle to its down position toward the carton interior to cause the T head forming air jets to move across the bights of the U-shapes, (4) maintaining said first hot air nozzle at a level corresponding to the level of the lower U legs of each said first pair of fin forming panels, whereby the U shapes are at least partially heat activated to an adhesive condition but the remaining areas of each of said first pair of fin forming panels between the U legs are not heat activated.

2. The method of claim 1 wherein the T base forming horizontal row of hot air jets is of a length substantially equal to the length of the legs of the U shapes.

3. The method of claim 1 including the step of (5) moving said first nozzle back to its up position, (6) moving the carton horizontally to beneath a second hot air nozzle having air holes for producing horizontally directed air jets, said second hot air nozzle having an up and a down position, (7) horizontally moving a second carton to a position beneath said first hot air nozzle, (8) moving said first and second nozzles to their respective down positions.

4. The method of claim 3 wherein said second hot air nozzle has a first row of air holes of a length substantially equal to the length of the legs of said bights, and a second row of air holes of a length substantially equal to the width of said bight portions of said U shape.

5. The method of claim 3 wherein the first and second nozzles are joined to thereby move up and down together.

6. The method of claim 1 wherein said step (1) is preceded by the step of preheating from ambient temperature said first pair of oppositely disposed fin forming panels.

* * * * *